(12) United States Patent
Kao (10) Patent No.: US 11,875,079 B2
(45) Date of Patent: Jan. 16, 2024

(54) INDICATION ICON SHARING METHOD, INDICATION SIGNAL CONTROL METHOD AND INDICATION SIGNAL PROCESSING DEVICE

(71) Applicant: ATEN INTERNATIONAL CO., LTD., New Taipei (TW)

(72) Inventor: Kuo-Feng Kao, New Taipei (TW)

(73) Assignee: ATEN INTERNATIONAL CO., LTD., New Taipei (TW)

( * ) Notice: Subject to any disclaimer, the term of this patent is extended or adjusted under 35 U.S.C. 154(b) by 7 days.

(21) Appl. No.: 17/500,960

(22) Filed: Oct. 14, 2021

(65) Prior Publication Data
US 2022/0137913 A1    May 5, 2022

(30) Foreign Application Priority Data

Nov. 4, 2020  (TW) .................................. 109138335

(51) Int. Cl.
*G06F 3/14* (2006.01)
*H04W 4/02* (2018.01)
*G06F 3/04817* (2022.01)

(52) U.S. Cl.
CPC ........ *G06F 3/1454* (2013.01); *G06F 3/04817* (2013.01); *H04W 4/026* (2013.01)

(58) Field of Classification Search
CPC .. G06F 3/1454; G06F 3/04817; H04W 4/026; G09G 5/38; G09G 2354/00
See application file for complete search history.

(56) References Cited

U.S. PATENT DOCUMENTS

| 6,115,027 A | * | 9/2000 | Hao ........................ G06F 3/038 345/157 |
| 10,403,050 B1 | | 9/2019 | Beall |
| 2011/0141222 A1 | | 6/2011 | Hoelsæter |
| 2015/0126169 A1 | | 5/2015 | Kerger |
| 2015/0234468 A1 | * | 8/2015 | Hwang ................ G06F 3/0486 345/156 |
| 2015/0339090 A1 | * | 11/2015 | Lee ....................... G06F 3/0488 345/173 |
| 2017/0206050 A1 | * | 7/2017 | Liu ......................... G06F 9/451 |
| 2021/0240343 A1 | * | 8/2021 | Kobayashi ...... H04M 1/724097 |

FOREIGN PATENT DOCUMENTS

TW         201033892 A1    9/2010

* cited by examiner

*Primary Examiner* — Sahlu Okebato
(74) *Attorney, Agent, or Firm* — Winston Hsu (57) ABSTRACT

An indication icon sharing method of multi-screens, applied to a first screen and a second screen, comprising: (a) performing a first trigger action by a first control device; (b) displaying a first indication icon at a first location on the first screen corresponding to the first trigger action; and (c) displaying the first indication icon on the second screen.

16 Claims, 11 Drawing Sheets

INDICATION ICON SHARING METHOD, INDICATION SIGNAL CONTROL METHOD AND INDICATION SIGNAL PROCESSING DEVICE

BACKGROUND OF THE INVENTION

1. Field of the Invention

The present invention relates to an indication signal sharing method, an indication signal control method and an indication signal processing device, and particularly relates to an indication signal sharing method, an indication signal control method and an indication signal processing device which can be applied for multi-screens.

2. Description of the Prior Art

In business conferences, conference tools such as laser pointers are always needed to generate indication light points, so that participants can understand and communicate with other participants more easily. Conventionally, the number of conference tools is usually fixed in the conference room for participants to use. However, there are some problems for such state. For example, the number of conference tools which is fixed is usually far fewer than the number of participants. Therefore, participants have to take turns to use these conference tools, thus some inconvenience is caused. In addition, the storage and power maintenance of conference tools often cause additional burdens.

In addition, remote conferences are becoming more and more popular in modern society. However, the usefulness of conventional conference tools may be limited when used in remote conferences. For example, the remote participant may only see the contents shown on the presenter's computer at the other end but not the light point formed by the conference tool, due to limitations of function of the remote conference device. Such issues may affect performance the remote conference.

SUMMARY OF THE INVENTION

One embodiment of the present invention discloses an indication icon sharing method of multi-screens, applied to a first screen and a second screen, comprising: (a) performing a first trigger action by a first control device; (b) displaying a first indication icon at a first location on the first screen corresponding to the first trigger action; and (c) displaying the first indication icon on the second screen.

Another embodiment of the present invention discloses an indication signal processing method applied to an indication signal processing device, comprising: (a) receiving information of a first trigger action of a first control device by the indication signal processing device; (b) displaying a first indication icon at a first location on the first screen corresponding to the information of the first trigger action by the indication signal processing device; and (c) transmitting information of the first indication icon to a second screen by the indication signal processing device and displaying the first indication icon on the second screen.

Still another embodiment of the present invention discloses an indication signal processing device, comprising: a processing circuit, configured to receive information of a first trigger action of a first control device and to generate a first indication icon according to the information of the first trigger action; a first image output port, coupled to the processing circuit and a first screen, configured to transmit the first indication icon to the first screen so that the first screen displays the first indication icon; and a second image output port, coupled to the processing circuit and a second screen, configured to transmit the first indication icon to the second screen so that the second screen displays the first indication icon corresponding to displaying of the first indication icon on the first screen.

In view of above-mentioned embodiments, remote participants in different rooms, even different regions or countries, can interact with each other. Also, the handheld devices owned by the participants can be used as conference tools, such that remote conferences using multi-screens can be more efficient.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the term "first", "second", "third" in following descriptions are only for the purpose of distinguishing different components, parameters, data, signals or steps, and do not mean the sequences thereof. The components, parameters, data, signals or steps can comprise the same structure or contents, or comprise different structures or contents. Additionally, the following embodiments are applied for a conference. However, the methods and devices provided by the present invention are not limited to conferences.

Figure 1:
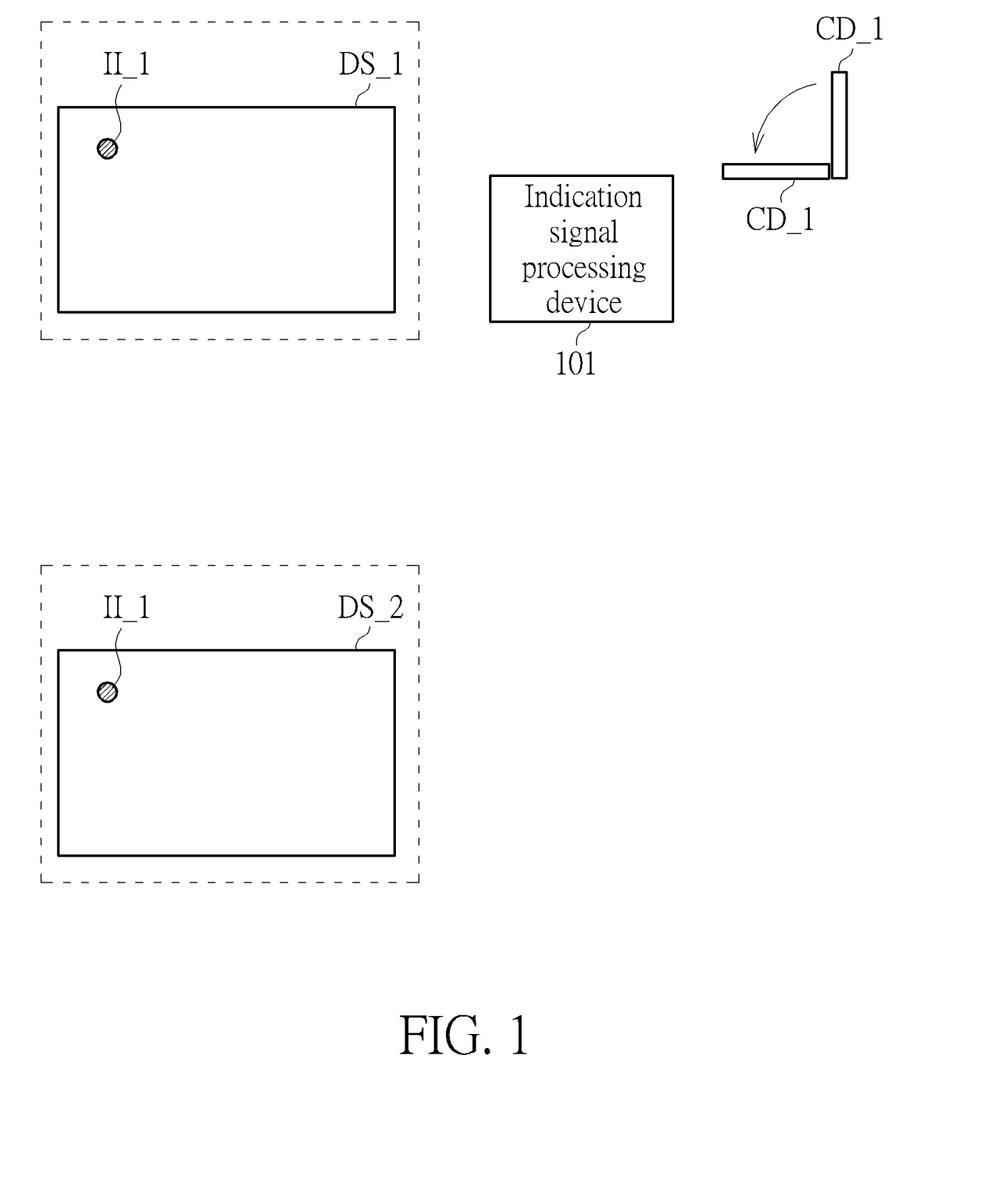
FIG. 1-FIG. 4 are schematic diagrams illustrating an indication icon sharing method according to embodiments of the present invention.

FIG. 1-FIG. 4 are schematic diagrams illustrating an indication icon sharing method according to embodiments of the present invention. As shown in FIG. 1, the participant uses a first control device CD_1 to perform a first trigger action. Corresponding to the first trigger action, a first indication icon II_1 is displayed at a first location on the first screen DS_1. The second screen DS_2 also correspondingly displays the first indication icon II_1. The first indication icon II_1 can be a combination of various colors or shapes, for example, it can be a red light point, a green triangle, or an orange square. The first screen DS_1 and the second screen DS_2 may be located in the same room (for example, the same conference room or exhibition hall), but may also be located in different rooms, different buildings, or different countries. Please also note that the first indication icon II_1 displayed on the first screen DS_1 and the first indication icon II_1 displayed on the second screen DS_2 may have the same color and shape, but may have different colors or shapes. Moreover, the positional relationship between the first indication icon II_1 on the first screen DS_1 and the first screen DS_1 can be the same as the positional relationship between the first indication icon II_1 on the second screen DS_2 and the second screen DS_2. However, the positional relationships may be different. Please also note that in the embodiments shown in FIGS. 1 to 4, the dashed frames around the first screen DS_1 and the second screen DS_2 represent the space around the first screen DS_1 and the second screen DS_2. For example, when the first screen DS_1 and the second screen DS_2 are respectively hung on the wall, the dashed frames represent the wall around the first screen DS_1 and the second screen DS_2. Further, when the first screen DS_1 and the second screen DS_2 are respectively placed on an office desk in an office, the dashed frames represent the office space around the first screen DS_1 and the second screen DS_2.

In one embodiment, the first trigger action is to swing the first control device CD_1, as shown in FIG. 1. However, the first trigger action can also be replaced by other actions. For example, the first trigger action can be a moving action of the first control device CD_1 (for example, moving from a third position to a fourth position), or the participant can perform a gesture by the first control device CD_1, or the participant triggers a button on the first control device CD_1 or a program installed by the first control device CD_1. In one embodiment, the first control device CD_1 is a mobile electronic device (such as a mobile phone), and the mobile electronic device can participate in performing the indication icon sharing method provided by the present invention by executing a stored program (e.g., an application program). Due to the popularity of mobile phones, most participants can have a conference tool via executing the program, and multiple participants can use the indication icon sharing method provided by the present invention at the same time, which can improve the conventional conference issues, that the problem for participants to take turns to use few conference tools.

In addition, in one embodiment, the first indication icon II_1 is displayed corresponding to the identification information of the first control device CD_1, such as the MAC address of the first control device CD_1 or the identification information stored by the first control device CD_1. This identification information can represent different participants or different control devices. For example, when the identification information represents that participant A uses the first control device CD_1 to perform the first trigger action, the first indication icon II_1 is a red light point, and when the identification information represents that participant B uses the first control device CD_1 to perform the first trigger action, the first indication icon II_1 is a green light point. Or, when the first control device CD_1 is used to perform the first trigger action, the first indication icon II_1 is a yellow light point, and when another control device is used to perform the second trigger action, the first indication icon II_1 is a blue light point.

Figure 2:
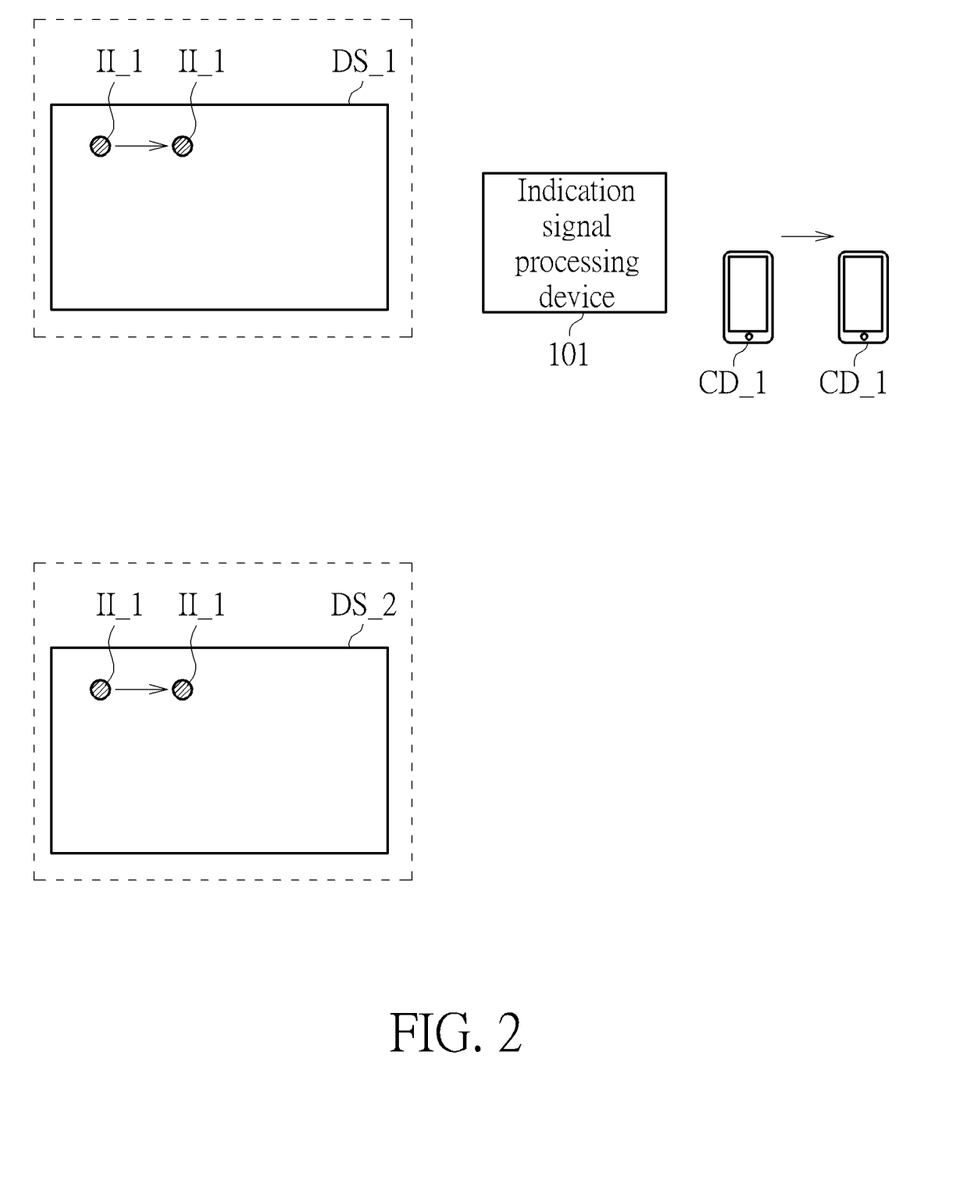

In another embodiment, the first indication icon II_1 can be displayed without the identification information of the first control device CD_1. For example, when participant A uses the first control device CD_1 to perform the first trigger action, the first indication icon II_1 is a red light point, and when the participant A uses the first control device CD_1 again to perform the first trigger action, the first indication icon II_1 is a green light point. Or, when the first control device CD_1 is used to perform the first trigger action, the first indication icon II_1 is a yellow light point, and when another control device is used to perform the second trigger action, the first indication icon II_1 is a blue color light point. In other words, the corresponding relationships between the identification information and the participants are not recorded, thus any participant who performs the trigger action can obtain the first indication pattern II_1 of any color at the moment. The colors can be random colors, or colors assigned according to a stored predetermined order. In one embodiment, after displaying the first indication icon II_1 triggered by the first trigger action, the first indication icon II_1 can be moved on the first screen corresponding to the displacement of the first control device CD_1. As shown in FIG. 2, when the first control device CD_1 produces a displacement, the first indication icon II_1 on the first screen DS_1 moves correspondingly, and the first indication icon II_1 on the second screen DS_2 moves correspondingly. The displacement here can be the displacement produced from a part of the first control device CD_1 or the entire first control device CD_1. Various methods can be used to obtain the displacement of the first control device CD_1. In one embodiment, the first control device CD_1 has a gravity sensor, and the gravity sensor can be used to sense the displacement of the first control device CD_1 in multiple directions to generate displacement information.

The operations shown in FIGS. 1 and 2 can be performed by an indication signal processing device 101. Namely, after the indication signal processing device 101 detects the first trigger action of the first control device CD_1, that is, receives the information of the first trigger action, the indication signal processing device 101 draws the first indication icon II_1 accordingly and transmits the image of the first indication icon II_1 to the first screen DS_1 such that the first screen DS_1 is controlled to display the first indication icon II_1 at the first location. The first location may be a preset location, a location determined after the first trigger action is detected, or a random location. Then, the indication signal processing device 101 controls the first screen DS_1 to display the movement of the first indication icon II_1 according to the received displacement of the first control device CD_1. The aforementioned first trigger action and displacement can be regarded as the indication signals received by the indication signal processing device 101. The information corresponding to the aforementioned first trigger action is different corresponding to different first trigger actions. For example, when the first trigger action is swinging or moving the first control device CD_1, the information of the first trigger action may be the displacement information of the first control device CD_1. If the first trigger action is to trigger a specific button or program, the information of the first trigger action may be information generated by the specific button or program of the first control device CD_1.

The indication signal processing device 101 can also be used to generate other images, such as contents to be viewed during a conference, and the first indication icon II_1 is superimposed on this type of image. By this way, the participant can control the first indication icon II_1 on the first screen DS_1 via the first control device CD_1 to conduct the conference. Participants who can only watch the second screen DS_2 but not the first screen DS_1 can also view the information displayed on the first screen DS_1 and the first indication icon II_1 via the second screen DS_2, so that they can understand the contents of the conference more clearly. The detail operations and structures of the indication signal processing device 101 will be described for more details in following descriptions. Please note, the actions in FIGS. 1 and 2 and the extended actions based on FIGS. 1 and 2, as well as the subsequent embodiments can be performed by other types of electronic devices, and are not limited to an indication signal processing device with specific structures. For example, it can be performed by the mobile phone of one of the participants, or the notebook computer carried by the participant.

Figure 3:
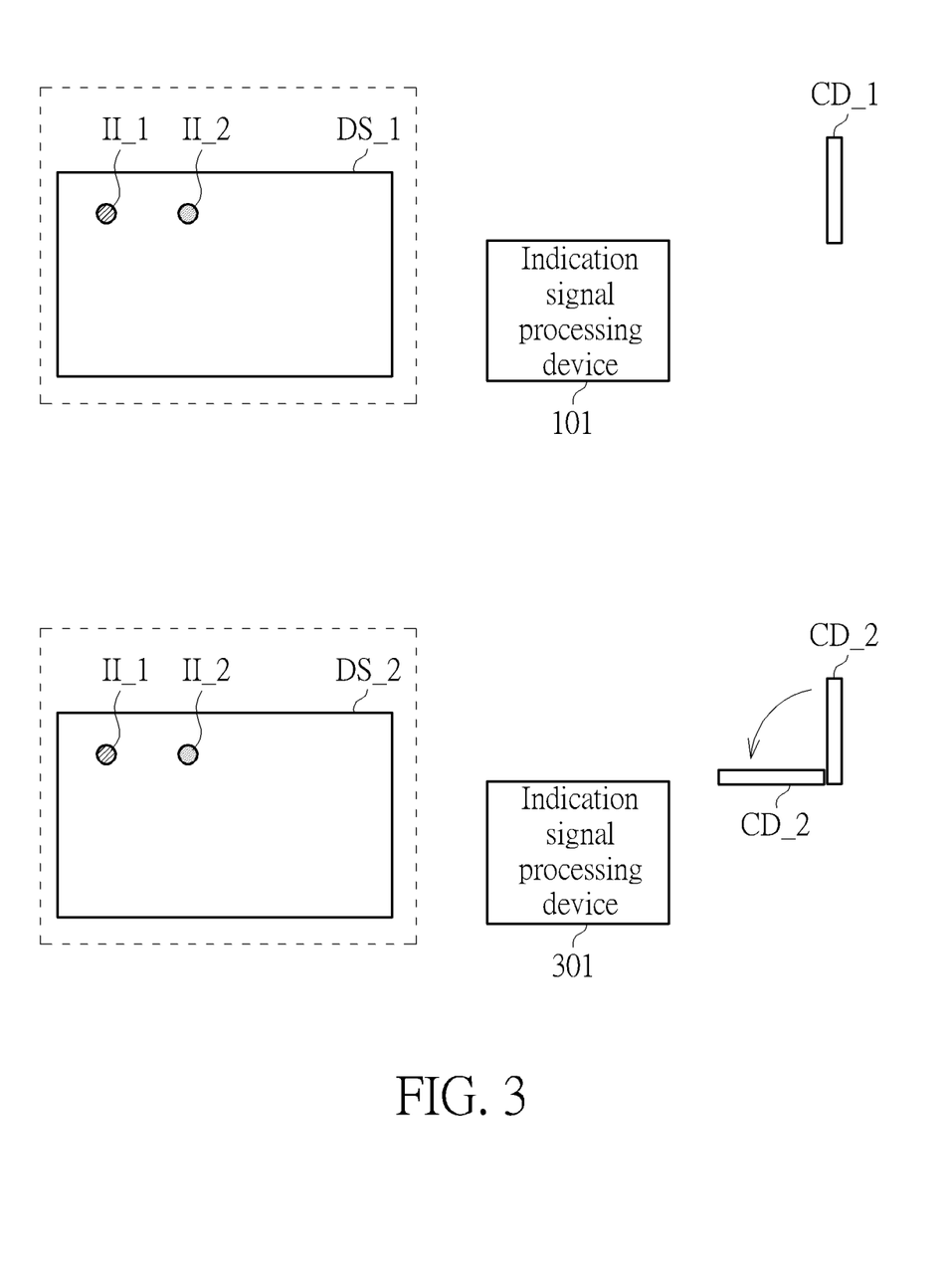
Figure 4:
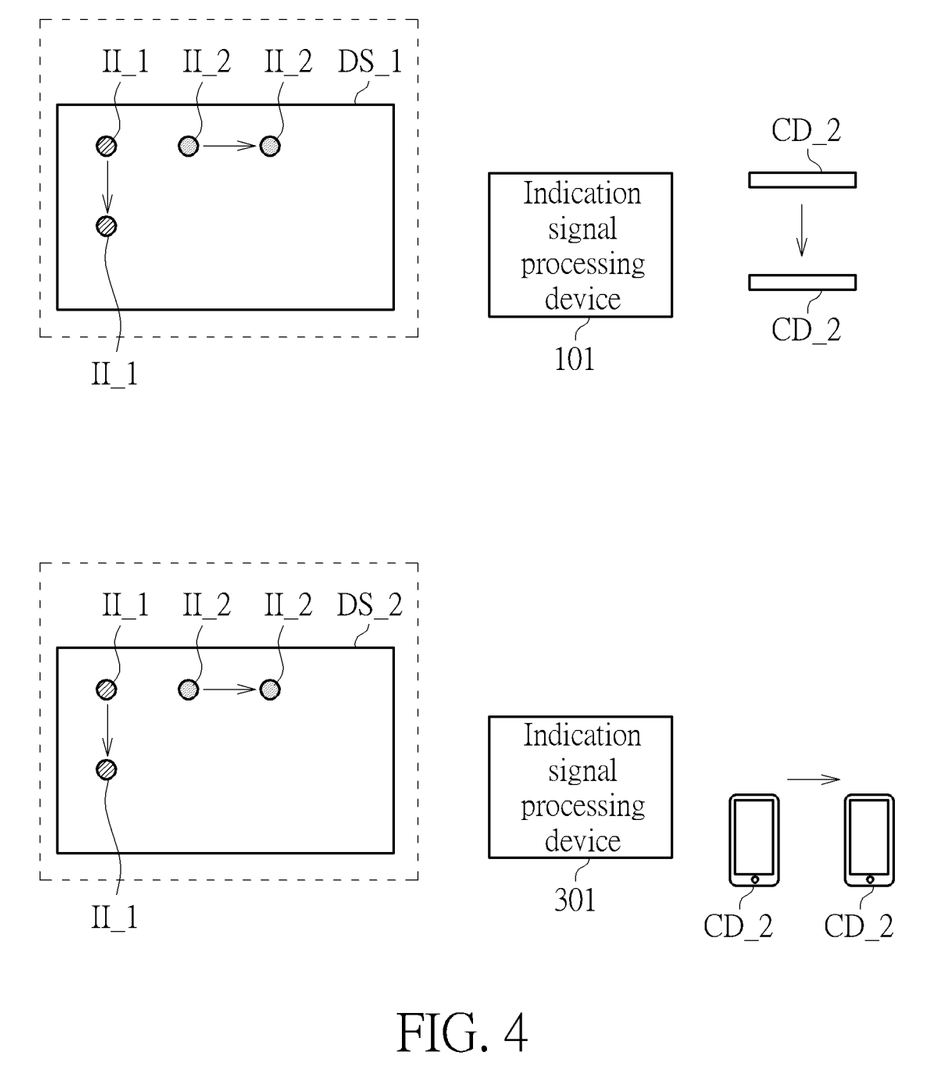

The indication icon sharing method provided by the present invention not only allows viewers of different screens to share information, but also allows participants who use different screens to interact. As shown in FIG. 3, the participant using the second screen DS_2 uses a second control device CD 2 to perform a second trigger action. Corresponding to the second trigger action, a second indication icon II_2 is displayed at a second location on the second screen DS_2. The first screen DS_1 also correspondingly displays the second indication icon II_2. Then, the second indication icon II_2 on the second screen DS_2 moves corresponding to the displacement of the second control device DS_2, as shown in FIG. 4. The movement display of the first indication icon II_1 and the second indication icon II_2 may be simultaneous or non-simultaneous.

In the embodiment of FIG. 4, the first indication icon II_1 can also be triggered to display and move as shown in FIGS. 1 and 2, and can be moved in the same way as the second indication icon II_2. It can also move in a different way from the second indicator II_2. As shown in FIG. 4, the second control device CD 2 moves horizontally, so the second indication icon II_2 moves horizontally. Also, the first control device CD_1 moves vertically, so the first indication icon II_1 moves vertically. By this way, users who use the first screen DS_1 and the second screen DS_2 can interact efficiently and clearly. The technical details of the second control device CD 2, the second trigger action and the second location are the same as the aforementioned first control device CD_1, the first trigger action and the first location, so are omitted for brevity here. Please note, however, the movements of the aforementioned first indication icon II_1 and the second indication icon II_2 are not limited to the aforementioned examples. Moreover, the method for sharing indication icons provided by the present invention is not limited to using two control devices and two indication icons. More than two control devices and more than two indication icons may also be used.

In the embodiments of FIGS. 3 and 4, the drawing of the second indication icon II_2 can be performed by another indication signal processing device, such as the indication signal processing device 301 in the embodiments of FIGS. 3 and 4. In another embodiment, the indication signal processing device 301 is only responsible for generating the image of the second indication icon II_2 without generating the image of the conference information, so it can be replaced by other computer devices with weaker graphics drawing capabilities.

Figure 5:
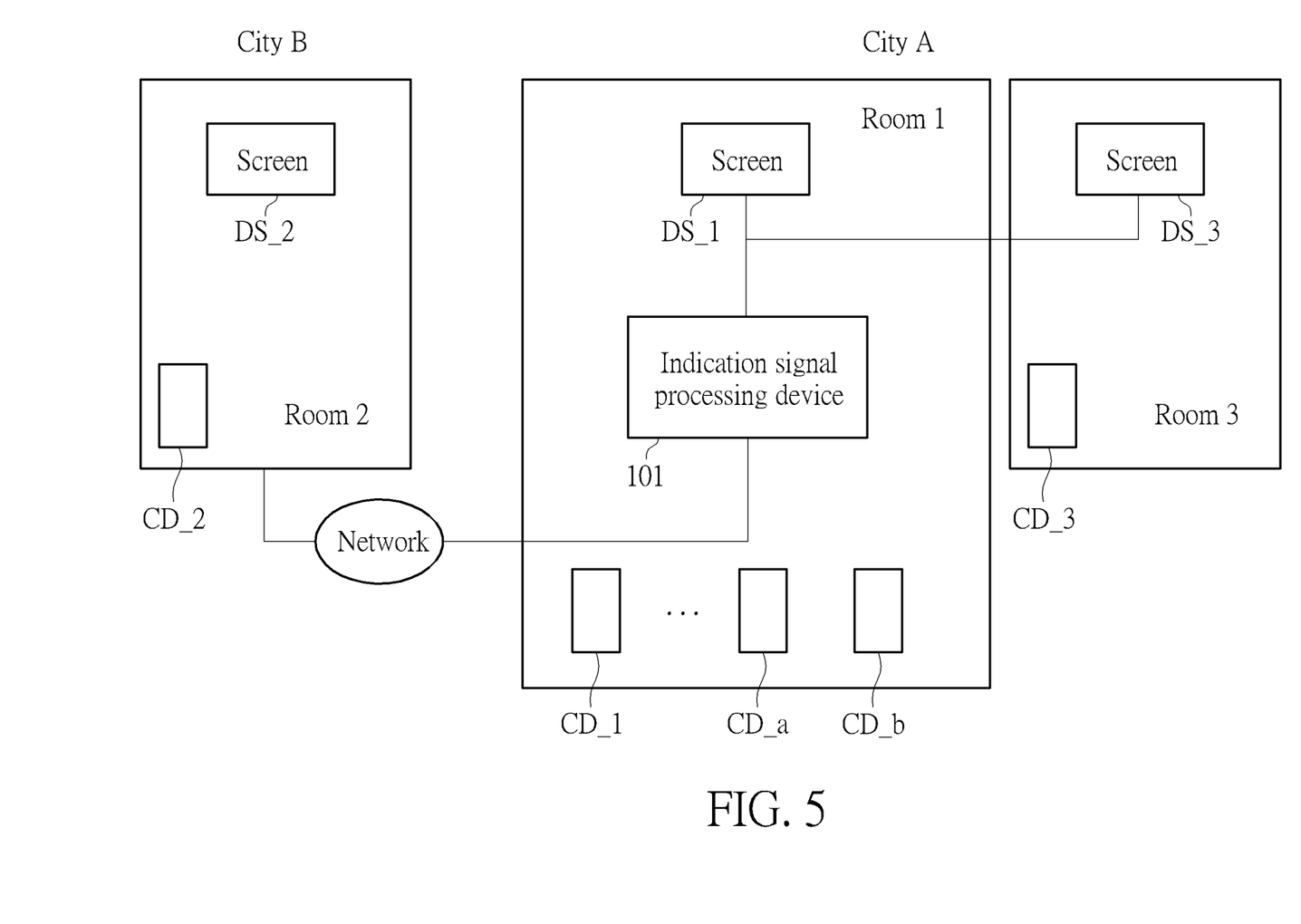
FIG. 5 is a schematic diagram illustrating arrangements of the indication signal processing device and other devices, according to one embodiment of the present invention.

FIG. 5 is a schematic diagram illustrating arrangements of the indication signal processing device and other devices, according to one embodiment of the present invention. Please also note that FIG. 5 is only an example of the arrangement, and is not used to limit the arrangement of the indication signal processing device of the present invention. As shown in FIG. 5, the aforementioned first screen DS_1, the indication signal processing device 101 and the first control device CD_1 are all located in room 1 in city A. Also, the signal processing device 101 can generate indication icons corresponding to other control devices CD a, CD b besides the first control device CD_1. The aforementioned second screen DS_2 and second control device CD 2 are both located in room 2 in city B. In such case, the indication signal processing device 101 can transmit the aforementioned first indication icon II_1 and other images to the second screen DS_2 through the network, and the aforementioned second indication icon II_2 can also be transmitted through the network to the first screen DS_1. In the embodiment of FIG. 5, the indicating signal processing device 101 is further connected to a third screen DS_3, which is located in the room 3, and the room 3 and the room are in the same building. Therefore, the indication signal processing device 101 can be connected to the third screen DS_3 through a direct line connection or a local area network. The third screen DS_3 can display a third indication icon corresponding to the triggering and movement of the third control device CD 3, and the first screen DS_1 and the second screen DS_2 can also display the third indication icon correspondingly. In another embodiment, the aforementioned second indication icon II_2 and the third indication icon can be generated by the indication signal processing device or the computer device located in the room 2 or the room 3, respectively.

Please refer to FIG. 1 again. In order to avoid the action of the first control device CD_1 mistakenly triggering the generation and movement of the first indication icon II_1. In one embodiment, when the first trigger action is generated, the first control device CD_1 first detect whether the first screen DS_1 is within a predetermined angle range of the first control device CD_1 (that is, positioning the location of the first control device CD_1). The first display device DS_1 displays the first indication icon II_1 corresponding to the first trigger action only when the first screen DS_1 is within the predetermined angle range of the first control device CD_1 and the first trigger action is detected. Such action can also be accomplished by the indication signal processing device 101. Please also note that although the following embodiments are described with the example shown in FIG. 1, they can be applied to other illustrated embodiments. In addition, the "first screen DS_1 located within the predetermined angle range" described in FIGS. 6A and 6B may mean that all the first screen DS_1 are located within the predetermined angle range, but it may also mean only portion of the first screen DS_1 is within the predetermined angle range.

Figure 6A:
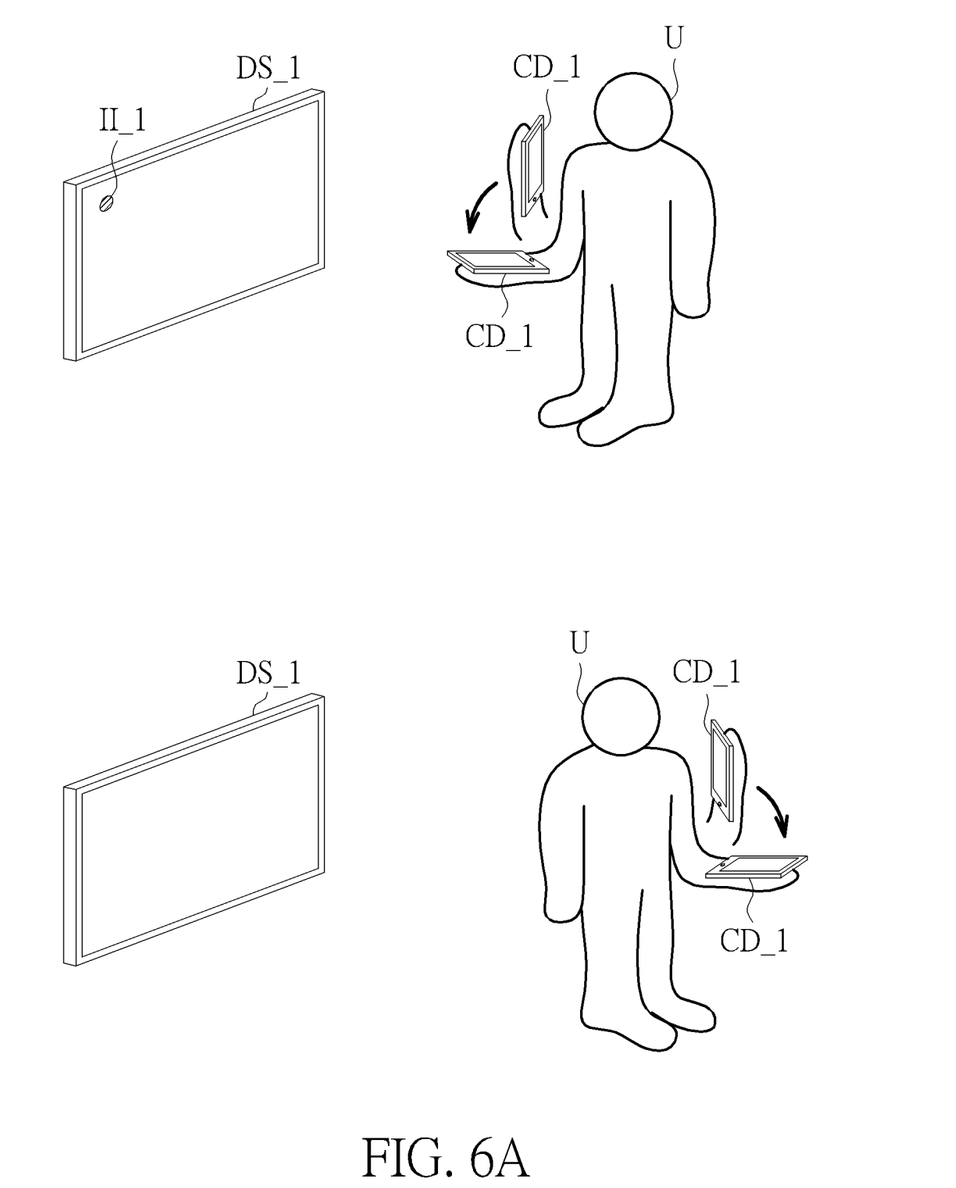
FIG. 6A and FIG. 6B are schematic diagrams illustrating of how to detect whether the first screen is in a first predetermined angle region of a first control device, according to one embodiment of the present invention.

FIG. 6A is a schematic diagrams illustrating of how to detect whether the first screen is in a first predetermined angle region of a first control device, according to one embodiment of the present invention. As shown in FIG. 6A, when the first screen DS_1 is in front of the first control device CD_1, that is, within a predetermined angle range (for example, in 120 degrees) of the first control device CD_1, the participant U can use a first trigger action to trigger the first indication icon II_1 is displayed on the first screen DS_1. When the first screen DS_1 is behind the first control device CD_1, that is, not within the predetermined angle range of the first control device CD_1, even if the participant U performs the first trigger action, it does not trigger the first Indication icon II_1 displayed on the first screen DS_1. For more detail, the predetermined angle range means an angle range centered on a specific part of the first control device CD_1. When the first control device CD_1 is a mobile phone or other similar handheld device, the specific part can be the back or front of the first control device CD_1 or a position device (such as a geo magnetometer) in the first control device CD_1.

Figure 6B:
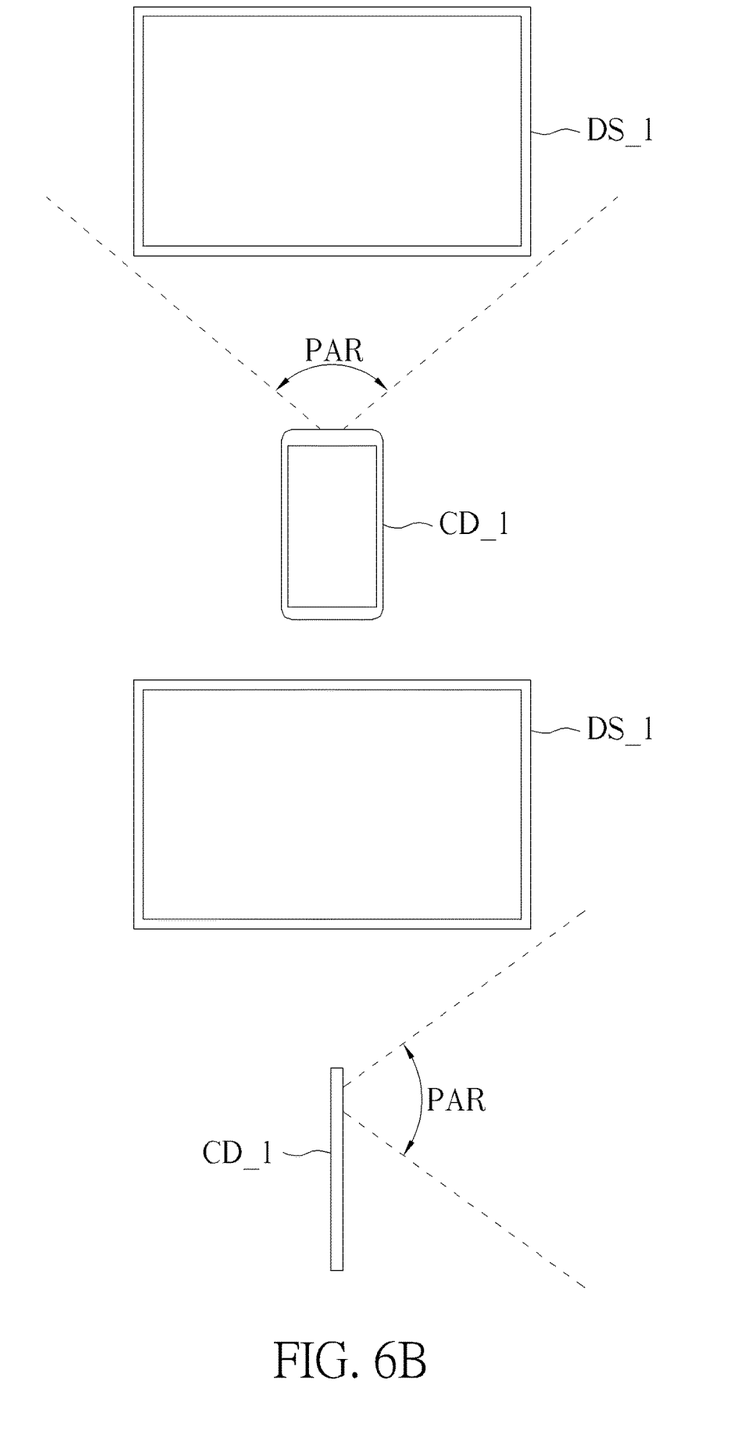

In order to describe the predetermined angle range more clearly, FIG. 6B illustrates another schematic diagram of determining whether the first screen DS_1 is within a predetermined angle range of the first control device according to an embodiment of the present invention. As shown in the upper diagram of FIG. 6B, the first screen DS_1 is located within a predetermined angle range PAR centered on the back of the first control device CD_1. As shown in the lower diagram of FIG. 6B, the participant deflects the first screen DS_1 by an angle, so the first screen DS_1 is not located within the predetermined angle range PAR centered on the back of the first control device CD_1.

Figure 7:
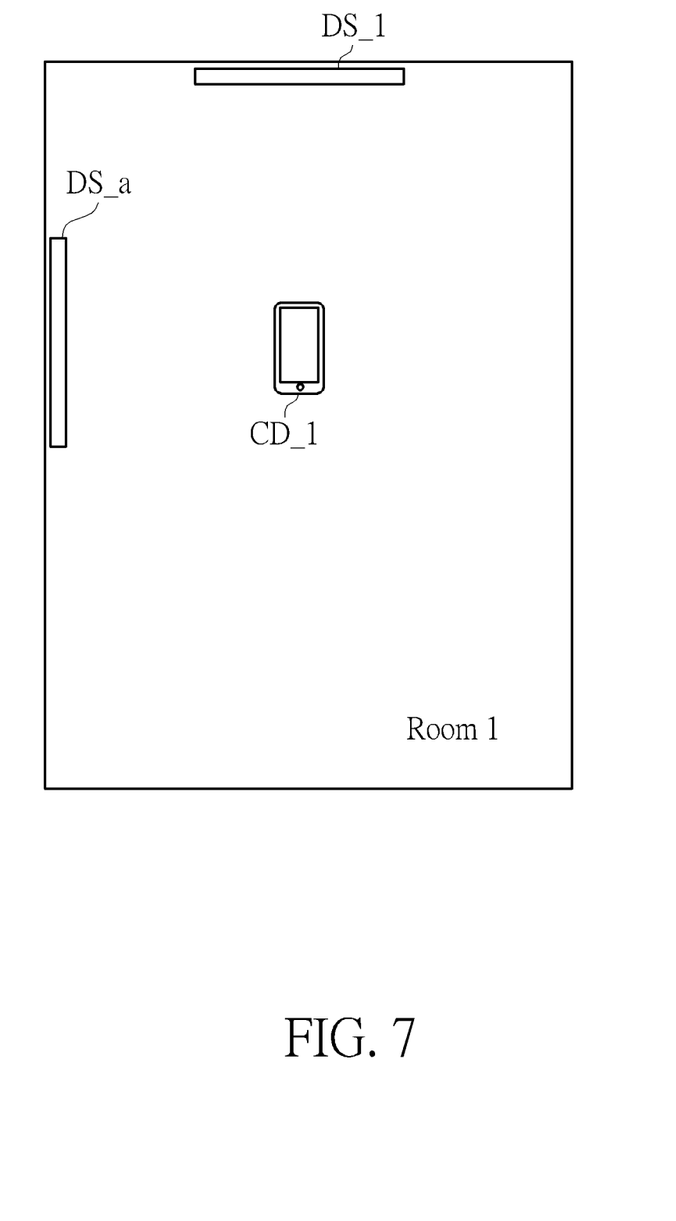
FIG. 7 is a schematic diagrams illustrating of how to detect whether the first screen is in a first predetermined angle region of a first control device, according to one embodiment of the present invention.

Various methods can be used to detect whether the first screen is within the predetermined angle range of the first control device CD_1. FIG. 7 is a schematic diagrams illustrating of how to detect whether the first screen is in a first predetermined angle region of a first control device, according to one embodiment of the present invention. As shown in FIG. 7, in room 1, in addition to the first screen DS_1, there is another screen DS a. In such case, the screen-geomagnetic relationships between the first screen DS_1 and the screen DS a are pre-recorded with a device containing a geo magnetometer. For example, the first screen DS_1 is located between the geo magnetic angle range a and the geo magnetic angle range b, and the screen DS a is located between the geo magnetic angle range m and the geo magnetic angle range n. These screen-geomagnetic relationships are pre-recorded in the indication signal processing device 101 shown in FIG. 1.

In this embodiment, the first control device CD_1 comprises a position device (such as a geo magnetometer). When the participant uses the first control device CD_1, the indication signal processing device 101 or the first control device CD_1 determines whether the first screen DS_1 is within a predetermined angle range of the first control device CD_1 according to the relationship between information measured by the position device and the pre-recorded screen-geomagnetic relationships. For example, if the position device in the first control device CD_1 measures that the first control device CD_1 is located between the geomagnetic angle range a and the geomagnetic angle range b but not between the geomagnetic angle range m and the geomagnetic angle range n. The signal processing device 101 or the first control device CD_1 determines that the first screen DS_1 is within the predetermined angle range of the first control device CD_1 but the screen DS a is not within the predetermined angle range of the first control device CD_1. Therefore, if the first control device CD_1 performs the first trigger action, it can trigger the first screen DS_1 to display the first indication icon II_1 but cannot trigger the screen DS a to display the first indication icon II_1.

In one embodiment, the first control device CD_1 comprises an image capture device, such as a camera. When the participant wants to trigger the display of the first indication icon II_1, the indication signal processing device 101 or the first control device CD_1 determines whether the first screen DS_1 is within a predetermined angle range of the first control device CD_1 based on an image captured by the image capture device, which contains features of the first screen DS_1. For more detail, in one embodiment, when the participant wants to trigger the display of the first indication icon II_1, a position step is performed to position the location of the first control device CD_1. In the position step, the participant must activate the camera in the first control device CD_1 or the first control device CD_1 automatically activates the camera according to the participant's gesture, and the participant captures the image in front of him (which can be a dynamic image or a static image). After that, the indication signal processing device 101 or the first control device CD_1 determines whether the first screen DS_1 is within the predetermined angle range of the first control device CD_1 according to whether the captured image comprises the first screen DS_1. Various methods can be used to determine whether the captured image comprises the first screen DS_1. For example, the first screen DS_1 contains many features that are different from the surrounding environment, such as corners or screen frames. Therefore, the indication signal processing device 101 or the first control device CD_1 can determine whether the captured image contains the first screen DS_1 based on these features. Alternatively, in one embodiment, a specific pattern or a light source may be provided on the first screen DS_1, thus the indication signal processing device 101 or the first control device CD_1 can determine whether the captured image contains the first screen DS_1 based on the pattern or the light source.

In one embodiment, the first control device CD_1 is used to detect whether the first screen DS_1 exists. In such case, the first trigger action triggers the display of the first indication icon II_1 only when the first control device CD_1 detects the existence of the first screen DS_1. Various methods can be used to detect the existence of the first screen DS_1, such as the method described in FIG. 7, or determines whether a screen DS_1 exists according to whether the image captured by the image capture device contains the features of the first screen DS_1 as described above.

Figure 8:
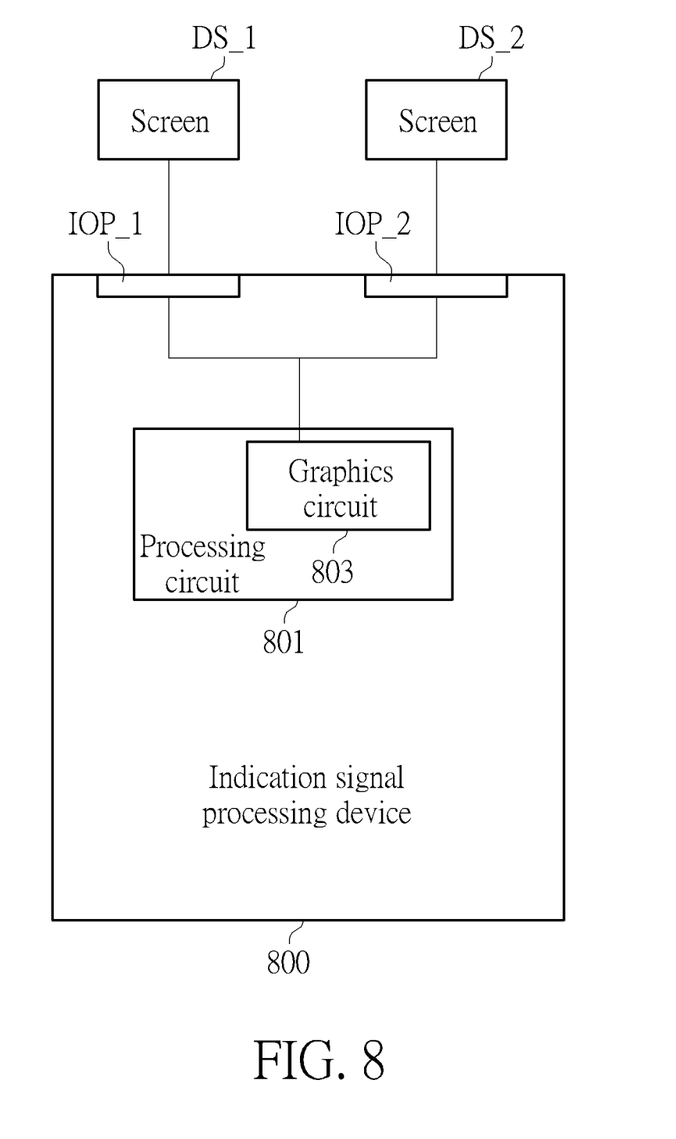
FIG. 8 is a block diagram illustrating an indication signal processing device according to one embodiment of the present invention.

The indication signal processing device used in the foregoing embodiments may comprise various structures to perform the above-mentioned embodiments. FIG. 8 is a block diagram illustrating an indication signal processing device 800 according to one embodiment of the present invention, but the indication signal processing device provided by the present invention may also have other structures. As shown in FIG. 8, the indication signal processing device 800 comprises a processing circuit 801, a graphics circuit 803, a first image output port IOP_1, and a second image output port IOP_2. The processing circuit 801 is configured to detect the above trigger action and to receive the displacement information of the control device to control the graphics circuit 803 to generate an image accordingly. The first image output port IOP_1 and the second image output port IOP_2 are configured to connect different screens. In one embodiment, the indication signal processing device 800 may further connect to other screens in the same room as the first screen DS_1 besides connect to the first screen DS_1, and switch between the first screen DS_1 and other screens.

For example, when the indication signal processing device 800 uses the embodiments shown in FIG. 1 and FIG. 2, the processing circuit 801 is configured to determine whether the first control device CD_1 performs a first trigger action. When the processing circuit 801 determines that the first control device CD_1 performs the first trigger action, it controls the graphics circuit 803 (e.g., a graphics card) to generate a first indication icon II_1 at a first position corresponding to the first trigger action. Also, the processing circuit 801 controls the graphics circuit 803 to generate the first indication icon II_1 at different locations (as shown in FIG. 2) corresponding to the displacement of the first control device CD_1. The first image output port IOP_1 transmits the first indication icon II_1 to the first screen DS_1, so that the first screen DS_1 displays the first indication icon II_1. The second video output port IOP_2 transmits the first indication icon II_1 to the second screen DS_2, so that the second screen DS_2 displays the first indication icon II_1 corresponding to the action of displaying the first indication icon II_1 on the first screen DS_1. In the embodiment of FIG. 8, the graphics circuit 803 can be integrated in the processing circuit 801. For example, the processing circuit 801 can be a microprocessor (MCU), and the processing circuit can be 801 has the function of a graphics circuit 803. However, the processing circuit 801 and the graphics circuit 803 may also be independent hardware.

Figure 9:
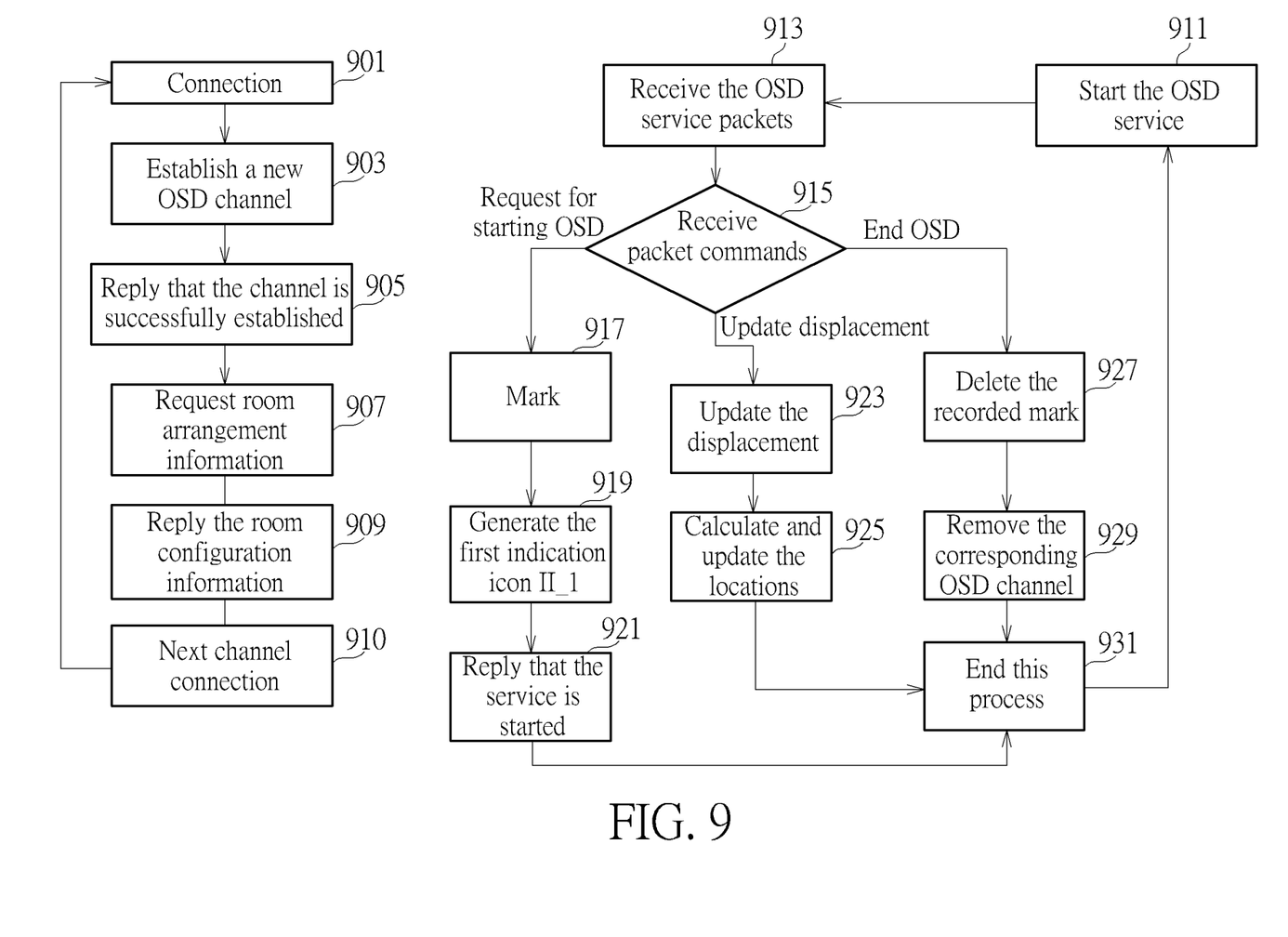
FIG. 9 is a flowchart illustrating operations of an indication signal processing device according to one embodiment of the present invention.

FIG. 9 is a flow chart illustrating operations of an indication signal processing device according to one embodiment of the present invention. First, it explains the flow of establishing a channel between the control device and the indication signal processing device, and then explains how the indication signal processing device performs OSD (On Screen Display) services. Please also note that this flow chart is only for example, and the flow chart may be different corresponding to different structures and different algorithms. FIG. 9 is illustrated with FIG. 1 as an example, but it can also be used in other embodiments.

Step 901

Start the connection of the control device.

Step 903

A new OSD channel is established. This OSD channel represents the communication channel between the first control device CD_1 and the indication signal processing device 101.

Step 905

The first control device CD_1 replies that the channel is successfully established.

Step 907

The first control device CD_1 requests the indication signal processing device 101 for room arrangement information (such as the aforementioned screen-geomagnetic relationship).

Step 909

The indication signal processing device 101 replies to the room configuration information.

Steps 907 and 909 represent that the first control device CD_1 determines whether the first screen DS_1 is within the predetermined angle range of the first control device CD_1 (that is, the position of the first control device CD_1 is performed). If this determination is made by the indication signal processing device 101, steps 907 and 909 can be changed to: the first control device CD_1 provides its position information to the indication signal processing device 101 and then the indication signal processing device 101 makes the determination. If the position of the first control device CD_1 is not performed, steps 907 and 909 may be removed.

Step 910

Perform the next channel connection, if no channel connection needs to be established, end the process of channel establishment.

Step 911

The indication signal processing device 101 starts the OSD service.

Step 913

The indication signal processing device 101 receives the OSD service packets from the first control device CD_1.

Step 915

The indication signal processing device 101 receives the packet commands.

Step 917

Create a mark (for example, flag) of the first control device CD_1, assign a corresponding color, and record it. For example, the indication signal processing device 101 records that the first control device CD_1 uses OSD channel 1 and uses the red first indication icon II_1.

Step 919

A first indication icon II_1 is generated at the first position.

Step 921

The indication signal processing device 101 replies that the service is started to the first control device CD_1 and goes to step 931.

Steps 917-921 correspond to the first trigger action in FIG. 1.

Step 923

Update the displacement of the first control device CD_1.

Step 925

Calculate and update the locations of the first indication icon II_1 using the recorded mark. Then go to step 931.

Steps 923 to 925 correspond to the displacement operation in FIG. 2.

Step 927

Delete the recorded mark of the first control device CD_1

Step 929

Remove the corresponding OSD channel.

Steps 927 and 929 can remove the connection between the first control device CD_1 and the indication signal processing device 101 when the participant finishes using the first control device CD_1.

Step 931

End this process, and then go to step 911 for the next OSD service. If there is no next OSD service, the process ends until the next OSD service packet is received.

Figure 10:
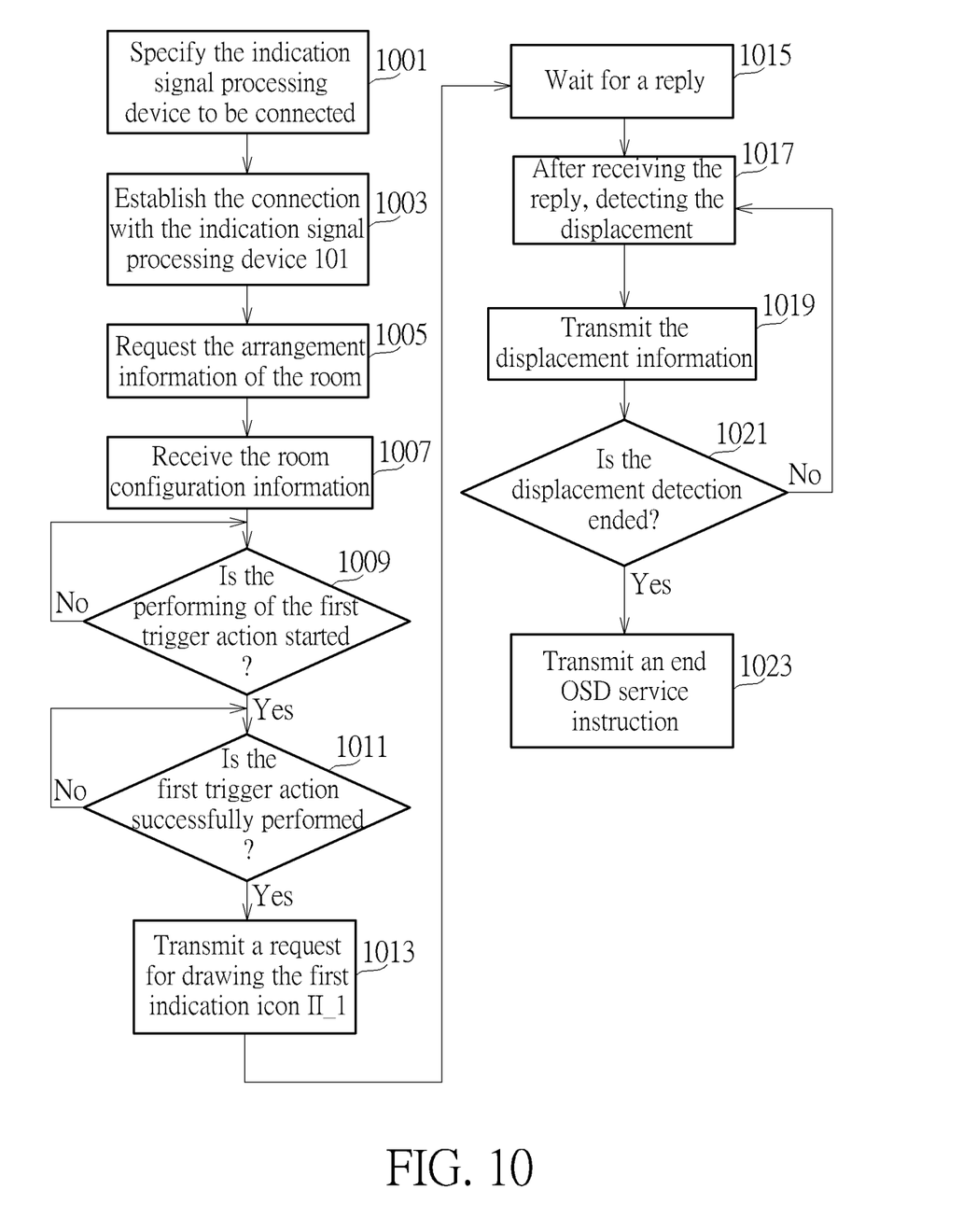
FIG. 10 is a flow chart illustrating operations of a control device according to one embodiment of the present invention.

FIG. 10 is a flow chart illustrating operations of a control device according to one embodiment of the present invention. Please also note that this flow chart is only for example, the flow chart may be different corresponding to different structures and different algorithms. FIG. 1 is used as an example in FIG. 10, but the embodiment in FIG. 10 can also be used in other embodiments.

FIG. 10 comprises following steps:

Step 1001

Specify the indication signal processing device to be connected, for example, specify the indication signal processing device 101.

Step 1003

Establish the connection with the indication signal processing device 101.

Step 1005

Request the arrangement information of the room.

Step 1007

Receive the room configuration information from the indication signal processing device 101.

Steps 1005 and 1007 represent that the first control device CD_1 determines whether the first screen DS_1 is within the predetermined angle range of the first control device CD_1. If this determination is performed by the indication signal processing device 101, steps 1005 and 1007 can be changed to: the first control device CD_1 provides its position information to the indication signal processing device 101 and then the indication signal processing device 101 makes the determination. If the position of the first control device CD_1 is not performed, steps 1007 and 1009 may be removed.

Step 1009

Does the first control device CD_1 start to perform the first trigger action? If it does not start to perform the first trigger action, it keeps staying in step 1009. If it starts, go to step 1011.

Step 1011

Does the first control device CD_1 successfully perform the first trigger action? If the first trigger action is not successfully performed, it keeps staying in step 1011 or returns to step 1009. If yes, go to step 1013.

Step 1013

Transmit a request for drawing the first indication icon II_1 to the indication signal processing device 101.

Step 1015

Wait for a reply from the indication signal processing device 101.

Step 1017

After receiving the reply from the indication signal processing device 101, the displacement of the first control device CD_1 is detected.

Step 1019

Transmit the displacement information to the indication signal processing device 101.

Step 1021

Determine whether the displacement detection is ended. If yes, go to step 1023, if not, go to step 1017.

Step 1023

Transmit an end OSD service instruction to the indication signal processing device 101.

In view of above-mentioned embodiments, remote participants in different rooms, even different regions or countries, can interact with each other. Also, the handheld devices owned by the participants can be used as conference tools, such that remote conferences using multi-screens can be more efficient.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An indication icon sharing method of multi-screens, applied to a conference and to a first screen and a second screen, comprising:
    (a) performing a first trigger action by a first control device;
    (b) displaying a first indication icon at a first location on the first screen corresponding to the first trigger action; and
    (c) displaying the first indication icon on the second screen;
    wherein the indication icon sharing method further comprises:
    performing a second trigger action by a second control device;
    displaying a second indication icon at a second location on the second screen corresponding to the second trigger action; and
    displaying the second indication icon on the first screen;
    wherein contents of the conference are displayed on the first screen and the second screen, wherein the first indication icon and the second indication icon are superimposed on the contents of the conference on the first screen and the second screen;
    wherein the first control device and the second control device are mobile electronic devices, which execute stored programs to perform the indication icon sharing method.

2. The indication icon sharing method of claim 1, further comprising:
    detecting displacement of the first control device to correspondingly move the first indication icon on the first screen and to correspondingly display displacement of the first indication icon on the second screen.

3. The indication icon sharing method of claim 1, further comprising:
    detecting whether the first screen exists or not via the first control device;
    wherein when the first control device detects the first screen in the step (a), then performing the step (b) that displaying the first indication icon corresponding to the first trigger action, and when the first control device does not detect the first screen in the step (a), then performing the step (b) that not displaying the first indication icon corresponding to the first trigger action.

4. The indication icon sharing method of claim 1, further comprising:
    (d) detecting whether the first screen is within a predetermined angle range of the first control device;
    wherein when the first screen is within the predetermined angle range in the step (a), then performing the step (b) that displaying the first indication icon corresponding to the first trigger action, and when the first screen is not within the predetermined angle range in the step (a), then performing the step (b) that not displaying the first indication icon corresponding to the first trigger action.

5. The indication icon sharing method of claim 4, wherein the first control device further comprises a position device, and the step (d) detects whether the first screen is within the predetermined angle range by following steps:
    determining whether the first screen is within the predetermined angle range according to a relation between information measured by the position device and pre-recorded screen-geomagnetism relations, while using the first control device.

6. The indication icon sharing method of claim 4, wherein the first control device further comprises an image capturing device, and the step (d) detects whether the first screen is within the predetermined angle range by following steps:
    determining whether the first screen is within the predetermined angle range according to an image captured by the image capturing device.

7. An indication signal processing method applied to a conference and to an indication signal processing device, comprising:
    (a) receiving information of a first trigger action of a first control device by the indication signal processing device;
    (b) displaying a first indication icon at a first location on a first screen corresponding to the information of the first trigger action by the indication signal processing device; and
    (c) transmitting information of the first indication icon to a second screen by the indication signal processing device and displaying the first indication icon on the second screen;
    wherein the indication signal processing method further comprises:

receiving information of a second trigger action of a second control device;

generating a second indication icon at a second location on the second screen corresponding to the information of the second trigger action; and displaying the second indication icon on the first screen corresponding to the second indication icon on the second screen;

wherein contents of the conference are displayed on the first screen and the second screen, wherein the first indication icon and the second indication icon are superimposed on the contents of the conference;

wherein the first control device and the second control device are mobile electronic devices, which respectively execute stored programs to perform operations of the first control device and the second control device.

8. The indication signal processing method of claim 7, further comprising:

generating the first indication icon at different locations of the first screen corresponding to displacement of the first control device, by the indication signal processing device; and controlling the second screen to display the first indication icon by the indication signal processing device.

9. The indication signal processing method of claim 7, further comprising:

detecting whether the first screen exists or not via the first control device;

wherein when the first control device detects the first screen in the step (a), then performing the step (b) that displaying the first indication icon corresponding to the first trigger action, and when the first control device does not detect the first screen in the step (a), then performing the step (b) that not displaying the first indication icon corresponding to the first trigger action.

10. The indication signal processing method of claim 7, further comprising:

(d) determining whether the first screen is within a predetermined angle range of the first control device via the indication signal processing device or the first control device;

wherein when the first screen is within the predetermined angle range in the step (a), then performing the step (b) that displaying the first indication icon corresponding to the first trigger action, and when the first screen is not within the predetermined angle range in the step (a), then performing the step (b) that not displaying the first indication icon corresponding to the first trigger action.

11. The indication signal processing method of claim 10, wherein the first control device further comprises a position device, and the step (d) detects whether the first screen is within the predetermined angle range by following steps:

determining whether the first screen is within the predetermined angle range via the indication signal processing device or the first control device, according to a relation between information measured by the position device and prerecorded screen-geomagnetism relations, while using the first control device.

12. The indication signal processing method of claim 10, wherein the first control device further comprises an image capturing device, and the step (d) detects whether the first screen is within the predetermined angle range by following steps:

determining whether the first screen is within the predetermined angle range according to an image captured by the image capturing device, via the indication signal processing device or the first control device.

13. The indication signal processing method of claim 7, wherein the first trigger action is moving the first control device from a third location to a fourth location.

14. An indication signal processing device applied to a conference, comprising:

a processing circuit, configured to receive information of a first trigger action of a first control device and to generate a first indication icon according to the information of the first trigger action;

a first image output port, coupled to the processing circuit and a first screen, configured to transmit the first indication icon to the first screen so that the first screen displays the first indication icon; and a second image output port, coupled to the processing circuit and a second screen, configured to transmit the first indication icon to the second screen so that the second screen displays the first indication icon corresponding to the first indication icon on the first screen;

wherein the processing circuit further controls the second screen to display a second indication icon, and controls the first screen to display the second indication icon corresponding to the second indication icon on the second screen, wherein the second indication icon is generated by following steps:

receiving information of a second trigger action of a second control device;

generating the second indication icon at a second location on the second screen corresponding to the information of the second trigger action;

wherein contents of the conference are displayed on the first screen and the second screen, wherein the first indication icon and the second indication icon are superimposed on the contents of the conference;

wherein the first control device and the second control device are mobile electronic devices, which respectively execute stored programs to perform operations of the first control device and the second control device.

15. The indication signal processing device of claim 14, further comprises a graphics circuit coupled to the processing circuit, wherein the processing circuit controls the graphics circuit to generate the first indication icon when the processing circuit determines the first control device performs the first trigger action, and controls the graphics circuit to generate the first indication icon at different locations of the first screen corresponding to displacement of the first control device.

16. The indication signal processing device of claim 14, wherein the processing circuit generates the first indication icon corresponding to the first trigger action when the first control device detects the first screen and does not generate the first indication icon corresponding to the first trigger action when the first control device does not detect the first screen.

* * * * *